US012725105B2

(12) United States Patent
Goodwin et al.

(10) Patent No.: US 12,725,105 B2
(45) Date of Patent: Sep. 1, 2026

(54) EARLY WARNING FOR ISSUE VALIDATION FAILURE USING MACHINE LEARNING MODEL

(71) Applicant: Wells Fargo Bank, N.A., San Francisco, CA (US)

(72) Inventors: Michael Goodwin, Arlington, TX (US); Xiangchen Huo, Dallas, TX (US); Antonio Iniguez, Mesa, AZ (US); Brian Karp, Denver, CO (US); Jody Vandever, Earlham, IA (US); Robin Baldeo, Charlotte, NC (US); Sooji Ha, Moorestown, NJ (US); Efa Shukarey, Woodbury, MN (US); Prashamsh Takkalapally, Cumming, GA (US); Tsai-Hsuan Tsai, Harrison, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 190 days.

(21) Appl. No.: 18/345,964

(22) Filed: Jun. 30, 2023

(65) Prior Publication Data

US 2025/0005491 A1 Jan. 2, 2025

(51) Int. Cl.
*G06Q 10/00* (2026.01)
*G06Q 10/0635* (2023.01)

(52) U.S. Cl.
CPC ................................ *G06Q 10/0635* (2013.01)

(58) Field of Classification Search
None
See application file for complete search history.

(56) References Cited

U.S. PATENT DOCUMENTS 7,827,468 B2 11/2010 Kato et al.
7,836,378 B2 11/2010 Shaeffer et al.
(Continued)

FOREIGN PATENT DOCUMENTS

EP 4033421 A1 7/2022
WO 2022058997 A1 3/2022

OTHER PUBLICATIONS

N Polyzotis, M Zinkevich, S Roy et al. (Data validation for machine learning)— . . . of machine learning . . . , 2019—proceedings.mlsys.org (hereinafter Roy et al.). (Year: 2019).*
(Continued)

*Primary Examiner* — Hafiz A Kassim
(74) *Attorney, Agent, or Firm* — Shumaker & Sieffert, P.A.

(57) ABSTRACT

A computing system receives issue data for a plurality of issues from a risk management system. The issue data for each respective issue of the plurality of issues includes an issue identifier. The computing system generates issue validation risk scores for the plurality of issues. An issue validation risk score for the respective issue indicates a predicted probability that a resolution of the respective issue will fail validation within a fixed period of time. The computing system generates a warning message for at least the respective issue of the plurality of issues based on the issue validation risk score for the respective issue being greater than a threshold. The computing system revises parameters of the at least one machine learning model based on validation failure outcomes associated with the plurality of issues.

19 Claims, 8 Drawing Sheets

(56) References Cited

U.S. PATENT DOCUMENTS 8,630,886 B2 * 1/2014 White .................... G06Q 10/20 705/7.27
8,856,370 B2 10/2014 Staiger
9,548,987 B1 * 1/2017 Poole .................. H04L 63/1416
9,552,548 B1 * 1/2017 Brestoff ................... G06N 3/04
9,824,364 B2 11/2017 Galligan Davila et al.
10,304,014 B2 5/2019 Garza et al.
10,769,722 B1 * 9/2020 Flowers .............. H04M 3/5191
10,872,206 B2 12/2020 Snyder et al.
10,902,199 B2 1/2021 Dunn et al.
11,010,702 B1 * 5/2021 Shah .................. G06Q 10/0635
11,468,369 B1 10/2022 Wilson et al.
11,475,493 B2 10/2022 Acharya et al.
11,501,255 B2 11/2022 Mann et al.
2003/0050814 A1 * 3/2003 Stoneking .............. G06Q 10/10 705/7.39
2006/0143034 A1 * 6/2006 Rothermel ............. G06Q 10/10 705/301
2007/0016542 A1 1/2007 Rosauer et al.
2009/0006156 A1 * 1/2009 Hunt ...................... G06Q 30/02 705/7.11
2009/0234684 A1 * 9/2009 Stoke ................. G06Q 10/0635 707/999.2
2011/0004574 A1 * 1/2011 Jeong ....................... G06N 5/02 718/104
2012/0030079 A1 * 2/2012 Slater ................... G06Q 40/123 705/35
2012/0259752 A1 * 10/2012 Agee ...................... G06Q 40/00 705/35
2012/0303389 A1 * 11/2012 Friedman ............... G06Q 30/02 705/4
2013/0298230 A1 * 11/2013 Kumar .................... G06F 21/52 726/22
2013/0325763 A1 12/2013 Cantor et al.
2016/0371618 A1 * 12/2016 Leidner .............. G06Q 10/0635
2016/0373478 A1 12/2016 Doubleday et al.
2017/0357901 A1 * 12/2017 La Placa ................ G06Q 10/00
2018/0089694 A1 3/2018 Clark
2018/0203754 A1 * 7/2018 Beohar ................... G06F 40/30
2020/0273046 A1 * 8/2020 Biswas .................... G06N 3/08
2020/0279334 A1 * 9/2020 Billings ................. G06Q 40/08
2020/0364618 A1 * 11/2020 Peh .................... G06Q 10/0635
2021/0035159 A1 2/2021 Zhou et al.
2021/0042866 A1 2/2021 Shanahan
2021/0055417 A1 * 2/2021 Brokaw ................. G01B 11/24
2021/0124983 A1 4/2021 Axenie et al.
2021/0383927 A1 12/2021 Godden et al.
2022/0027744 A1 1/2022 Krishnan et al.
2022/0101186 A1 3/2022 Sharma Mittal et al.
2022/0108240 A1 * 4/2022 Liposky ............. G06Q 10/0635
2022/0261711 A1 * 8/2022 Krishna ................ G06F 16/353
2022/0286482 A1 * 9/2022 Barday ................... H04L 51/18
2022/0327012 A1 10/2022 Roy et al.
2022/0335362 A1 10/2022 Nikain et al.
2023/0385735 A1 * 11/2023 Ghosh ................ G06Q 10/0635
2024/0086818 A1 * 3/2024 Yarlagadda ............ G06Q 50/26
2024/0232765 A1 * 7/2024 Austraat ................. G06F 40/30

OTHER PUBLICATIONS

A Alonso Robisco et al. (Measuring the model risk-adjusted performance of machine) SpringerOpen · 2022 (hereinafter Robisco et al.). (Year: 2022).*
Guidi et al., “Random Forest for Automatic Assessment of Heart Failure Severity in a Telemonitoring Scenario”, 2013 35th Annual International Conference of the IEEE Engineering in Medicine and Biology Society, IEEE, Jul. 3, 2013, pp. 3230-3233, URL: http://139.91.210.27/CBML/PROCEEDINGS/2013_EMBC/PDFs/Papers/08681522.pdf.
Sheng-Yuan, “A Hybrid Due-Date fulfilled Forecasting Based on Clustering and Decision trees”, 2010 IEEE 17th International Conference on Industrial Engineering and Engineering Management, IEEE, Oct. 29, 2010, pp. 6-11, URL: https://ieeexplore.ieee.org/abstract/document/5646410.
Sulaiman et al., “The Quantitative Features Analysis of the Nonlinear Model of Crop Production by Hybrid Soft Computing Paradigm”, Agronomy, MDPI, Mar. 26, 2022, 18 pp., URL: https://www.mdpi.com/2073-4395/12/4/799.
U.S. Appl. No. 18/345,922, filed Jun. 30, 2023, naming inventors Goodwin et al.
Yuan et al., “A Single Machine Preemptive Scheduling Problem with Arbitrary Release Dates and Fuzzy Due Dates”, 2009 ISECS International Colloquium on Computing, Communication, Control, and Management, vol. 2, Aug. 8, 2009, pp. 474-477, URL: https://ieeexplore.ieee.org/abstract/document/5267472.
Response to Office Action dated May 8, 2025 from U.S. Appl. No. 18/345,922, filed Aug. 8, 2025, 11 pp.
Office Action from U.S. Appl. No. 18/345,922 dated May 8, 2025, 38 pp.
Robisco et al., “Measuring the model risk-adjusted performance of machine learning algorithms in credit default prediction”, Financial Innovation, vol. 8, No. 70, Dec. 2022, 35 pp.
Final Office Action from U.S. Appl. No. 18/345,922 dated Sep. 17, 2025, 36 pp.
Response to Office Action dated Sep. 17, 2025 from U.S. Appl. No. 18/345,922, filed Nov. 17, 2025, 11 pp.
Corrected Notice of Allowance from U.S. Appl. No. 18/345,922 dated Mar. 30, 2026, 2 pp.
Notice of Allowance from U.S. Appl. No. 18/345,922 dated Mar. 20, 2026, 21 pp.

* cited by examiner

Risk Rated Issue Dashboard

Issues Summary

| 506 Issue ID | 508 Issue Title | 510 Source | 512 Severity ranking | 502 Revised Due Date 3 Month | 504 Revised Due Date 6 Month | 514 Issue Status | 516 Issue Overall Validation Status |
|---|---|---|---|---|---|---|---|
| 557 | | Second line of defense | moderate | 55.2% | 63.0% | open | Not Yet Pending Validation |
| 1345 | | Self assessment | moderate | 42.8% | 30.6% | open | Not Yet Pending Validation |
| 567 | | Audit services | high | 41.5% | 32.3% | open | Not Yet Pending Validation |
| 890 | | Self assessment | moderate | 38.9% | 36.6% | open | Not Yet Pending Validation |
| 1434 | | Second line of defense | moderate | 33.6% | 41.2% | Pending Validation | Pending Internal Validation |

FIG. 5

Risk Rated Issue Dashboard

Issues Summary

| 606 Issue ID | 608 Issue Title | 610 Source | 612 Severity ranking | 602 Failed Validation 3 Month | 604 Failed Validation 6 Month | 614 Issue Status | 616 Issue Overall Validation Status |
|---|---|---|---|---|---|---|---|
| 1023 | | Self assessment | moderate | 96.7% | 54.4% | Pending Validation | Pending Internal Validation |
| 342 | | Audit services | moderate | 92.6% | 52.2% | Pending Validation | Pending Internal Validation |
| 230 | | Audit services | moderate | 92.4% | 47.6% | Pending Validation | Pending Internal Validation |
| 2177 | | Internal compliance | moderate | 92.1% | 72.3% | Pending Validation | Pending Internal Validation |
| 1783 | | Self assessment | moderate | 88.7% | 42.0% | Pending Validation | Pending Internal Validation |

FIG. 6

EARLY WARNING FOR ISSUE VALIDATION FAILURE USING MACHINE LEARNING MODEL

TECHNICAL FIELD

This disclosure relates to computer networks for prediction of operation issues.

BACKGROUND

Risk management systems may be used by organizations to manage risks associated with identified operation issues. The goal of a risk management system is to identify potential risks, assess their impact and likelihood, and develop strategies to mitigate or correct them. This may help organizations to make informed decisions, allocate resources more effectively, and minimize the potential harm of adverse events.

Risk management systems may include a governance, risk, and compliance (GRC) functionality used to manage and monitor governance, risk management, and compliance activities. GRC functionality may provide a centralized location for organizations to monitor and manage risk, track compliance with regulations, and make informed decisions about the management of governance processes. GRC functionality may provide a centralized repository for risk management information and help organizations identify, assess, and prioritize risks. GRC functionality may ensure compliance with regulations so as to avoid penalties and reputation damage.

SUMMARY

Risk management systems may track issues that organizations face in ensuring that their operations comply with legal and regulatory requirements, as well as internal policies and procedures. Risk management systems may store the issues with associated issue data such as issue identifiers, issue titles, issue descriptions, due dates, and other information. Issues are items which may need attention to be properly resolved. Issues may include regulatory issues driven by regulatory bodies and internal issues identified by employees internal to the organization.

A number of problems may occur with such issues in a risk management system. As one example, an issue may have an associated due date by which the issue needs to be resolved. This due date may be missed or require revision due to delays or resource constraints. In the case of regulatory issues, due date revisions may require obtaining permission from regulators to move or reset the due date for issue resolution. As another example, a corrective action for resolution of an issue may fail validation. A failed validation may occur if the resolution was insufficient to fix the issue as determined by an auditor, such as a regulator or an internal reviewer.

In some examples, a disclosed computing system uses one or more machine learning models to generate due date revision risk scores for the issues stored in the risk management system. A due date revision risk score for an issue indicates a predicted probability that the due date for resolution of the issue will need revision within a fixed period of time, e.g., 3 months, 6 months, 12 months, or the like. Such due date revision risk scores may allow users of the disclosed computing system, e.g., organization representatives, to identify issues for additional review and may enable prompt requests for due date extensions from the appropriate regulator. The disclosed computing system may generate warning messages and/or produce a dashboard indicating the issues and the due date revision risk scores to allow the users deal with issues that may require due date revisions.

In some examples, a disclosed computing system may produce predictions of whether an issue will fail validation as issue validation risk scores. Such issue validation risk scores may allow users to identify issues for special processing so that the users may sufficiently correct the issues before the due date. The disclosed computing system may generate warning messages and/or produce a dashboard indicating the issues and the issue validation risk scores to allow the users deal with issues that may fail validation.

The machine learning models trained to predict either due date revision or validation failure may input features extracted from the issue data stored in a risk management system and generate risk scores that indicate predicted probabilities of events within a period of time based on the features. In some examples, the system may include multiple machine learning models configured to generate a particular type of risk scores, e.g., the due date revision risk scores or the issue validation risk scores, for different periods of time, e.g., one model for each of 3 months and 6 months. In some cases, two or more of the machine learning models may generate the respective risk scores in parallel.

Machine learning systems may uncover hidden patterns with respect to due date revisions and issue validation failures of issues stored in the risk management system that humans find difficult to detect. By utilizing machine learning, the disclosed computing system may reduce the time it takes to identify and address high-risk issues, which ultimately mitigates risk and demonstrates compliance. The automated output of the disclosed computing system allows organizations to be alerted to the high-risk issues and prioritize addressing the high-risk issues via one or more dashboards displayed on a user-facing display device. Based on the indicators included on the dashboard, the users, e.g., organization representatives, may make necessary adjustments, avoid regulatory scrutiny, and improve outcomes.

The machine learning models may be continuously refreshed and updated to improve the prediction of due date revisions and issue validation failures. The computing system may revise parameters of the machine learning models based on monitored outcomes for the issues. For example, the accuracy of the machine learning models may be improved by revising the parameters of the machine learning models based on the monitored outcomes.

In some examples, the disclosed computing system comprises a method comprising: receiving, by a computing system, issue data for a plurality of issues from a risk management system, wherein the issue data for each respective issue of the plurality of issues includes an issue identifier; generating, by the computing system using at least one machine learning model and based on the issue data, issue validation risk scores for the plurality of issues, wherein an issue validation risk score for the respective issue indicates a predicted probability that a resolution of the respective issue will fail validation within a fixed period of time; generating a warning message for at least the respective issue of the plurality of issues based on the issue validation risk score for the respective issue being greater than a threshold; and revising parameters of the at least one machine learning model based on validation failure outcomes associated with the plurality of issues.

In some examples, the disclosed computing system comprises one or more storage devices; and processing circuitry in communication with the one or more storage devices, the processing circuitry configured to: receive issue data for a plurality of issues from a risk management system, wherein the issue data for each respective issue of the plurality of issues includes an issue identifier; generate, using at least one machine learning model and based on the issue data, issue validation risk scores for the plurality of issues, wherein an issue validation risk score for the respective issue indicates a predicted probability that a resolution of the respective issue will fail validation within a fixed period of time; generate a warning message for at least the respective issue of the plurality of issues based on the issue validation risk score for the respective issue being greater than a threshold; and revise parameters of the at least one machine learning model based on validation failure outcomes associated with the plurality of issues.

In some examples, the disclosed non-transitory computer-readable storage medium comprises instructions that, when executed, cause processing circuitry to: receive issue data for a plurality of issues from a risk management system, wherein the issue data for each respective issue of the plurality of issues includes an issue identifier; generate, using at least one machine learning model and based on the issue data, issue validation risk scores for the plurality of issues, wherein an issue validation risk score for the respective issue indicates a predicted probability that a resolution of the respective issue will fail validation within a fixed period of time; generate a warning message for at least the respective issue of the plurality of issues based on the issue validation risk score for the respective issue being greater than a threshold; and revise parameters of the at least one machine learning model based on validation failure outcomes associated with the plurality of issues.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 5 is a diagram illustrating an example user interface dashboard produced by a dashboard generation module that includes indications of issue identifiers of one or more issues and due date revision risk scores associated with the one or more issues, in accordance with one or more aspects of the present disclosure.

FIG. 6 is a diagram illustrating an example user interface dashboard produced by a dashboard generation module that includes indications of issue identifiers of one or more issues and issue validation risk scores associated with the one or more issues, in accordance with one or more aspects of the present disclosure.

DETAILED DESCRIPTION

Figure 1:
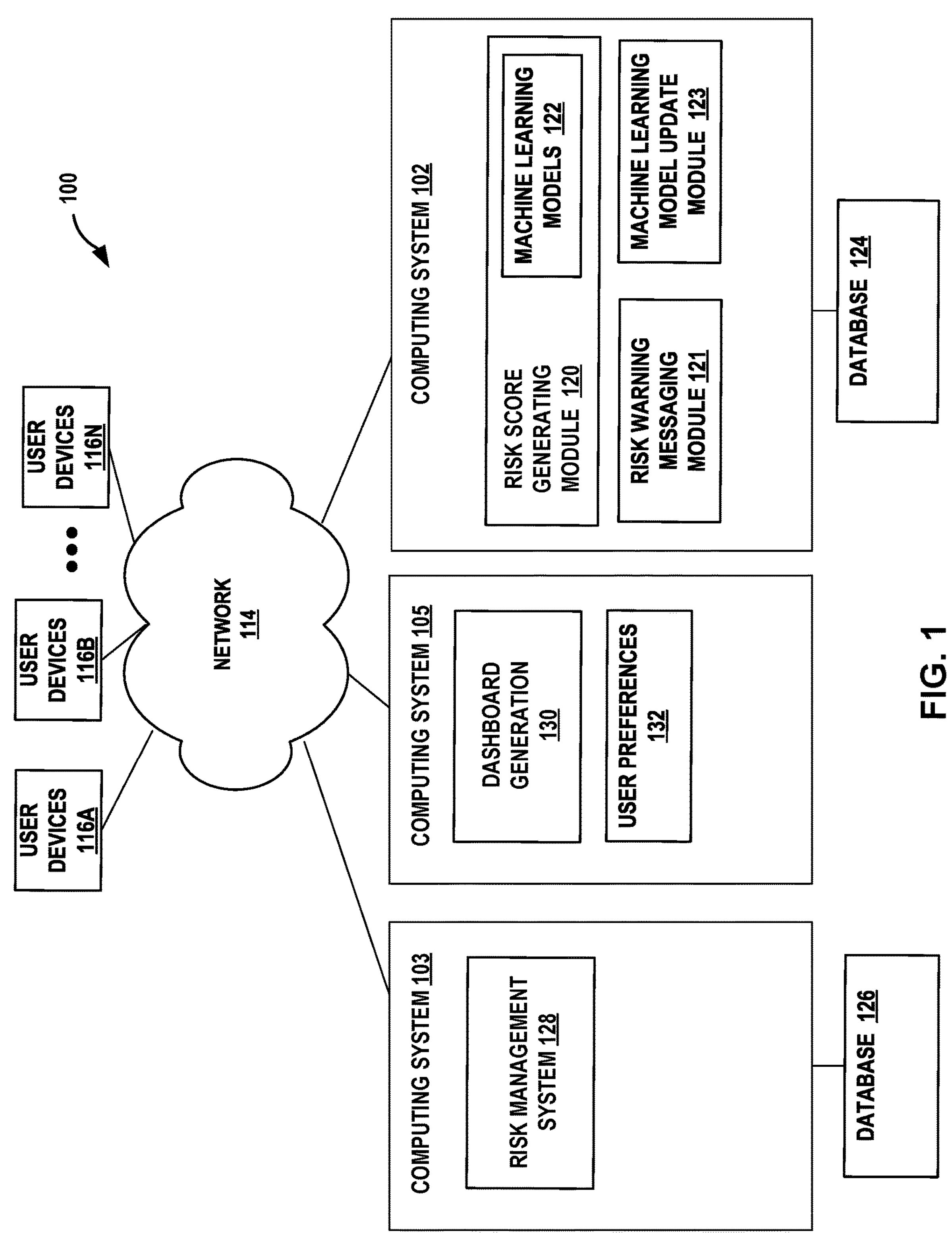
FIG. 1 is a block diagram illustrating an example network including a risk management system and a risk score generating module, in accordance with one or more aspects of the present disclosure.

FIG. 1 is a block diagram illustrating an example network including a risk management system 128 and risk score generating module 120, in accordance with one or more aspects of the present disclosure. As will be described below, computing system 102 may produce predictions of whether an issue will require a due date revision. Computing system 102 may also produce predictions of whether an issue will fail validation.

As illustrated in FIG. 1, enterprise network 100 may include multiple computing systems 102, 103, 105. The computing systems may be included in an enterprise network of an organization that includes a plurality of computing devices distributed across different geographical locations. Each of computing systems 102, 103, 105 may be implemented at one or more data centers comprising multiple computing devices. Platforms, units, and modules illustrated in FIG. 1 are shown as being stored and/or executed at particular computing systems 102, 103, or 105, but in other examples the platforms, units, and modules may be stored and/or executed according to different arrangements of the computing systems, such as within a single computing system, two computing systems, or across more than three computing systems.

Network 114 illustrated in FIG. 1 may include or represent any public or private communications network or other network. One or more client devices, server devices, or other devices may transmit and receive data, commands, control signals, and/or other information across such networks using any suitable communication techniques. In some examples, network 114 may be a separate network as illustrated in FIG. 1, or one or more of such networks may be a subnetwork of another network. In other examples, two or more of such networks may be combined into a single network; further, one or more of such networks may be, or may be part of, the internet. Accordingly, one or more of the devices or systems illustrated in FIG. 1 may be in a remote location relative to one or more other illustrated devices or systems. Network 114 illustrated in FIG. 1 may include one or more network hubs, network switches, network routers, network links, satellite dishes, or any other network equipment. Such devices or components may be operatively inter-coupled, thereby providing for the exchange of information between computers, devices, or other components (e.g., between one or more user devices or systems and one or more server devices or systems).

Computing system 103 includes a risk management system 128. Risk management system 128 may be or include a governance, risk, and compliance (GRC) functionality used to manage and monitor governance, risk management, and compliance activities. GRC functionality may provide a centralized location for organizations to monitor and manage risk, track compliance with regulations, and make informed decisions about the management of governance processes. Examples of commercially available risk management systems include RSA Archer, MetricStream, LogicManager and SAP Risk Management.

Risk management system 128 may help organizations identify, assess, monitor, and mitigate risks. Risk management system 128 may provide a central location to manage and track risks across various departments and business functions. Risk management system 128 may provide issue tracking for issues that may impact an organization. For example, risk management system 128 used for banking organizations may track internal and external issues related to the banking organization. Risk management system 128 may store data including issue data with associated features in database 126. Issue data for issues stored by risk management system 128 may include an issue identifier, issue description, issue due date, issue created date, issue title and other features. Some basic fields may be required for all issues entered into risk management system 128 but a risk rating field value may result in additional fields for issues. The risk rating may be a subjective severity rating of the risk of an issue with a value such as low, medium, high, and critical. Such a subjective severity rating is different than the due date revision risk score and/or issue validation risk score discussed below in that the subjective severity rating is set by a user and concerns the general importance of the issue. As discussed below, the due date revision risk score concerns the risk that a due date will be revised and the issue validation risk score concerns the risk that an issue will fail validation after being resolved (such as by a regulator).

External issues for banking organizations may include issues related to regulatory compliance issues from the Federal Reserve or the Office of the Comptroller of the Currency (OCC) regulations. In the context of banking regulation by the Federal Reserve or OCC, "Matter Requiring Attention" (MRA) and "Matter Requiring Immediate Attention" (MRIA) both refer to issues that have been identified as needing attention in order to maintain the safety and soundness of a financial institution. MRIA is considered more serious and requires prompt action, while an MRA may be a less pressing concern that still needs to be addressed but may have a longer timeline for resolution. Both MRAs and MRIAs are identified through the Federal Reserve's supervisory process.

Internal issues for banking organizations may include issues identified by auditing teams or other internal individuals or groups. For example, an internal audit of controls or rules may fail testing by an audit team and depending on the nature and extent of that failure there might be an issue that gets opened up in risk management system 128.

Computing system 102 may use the issue data from risk management system 128 at computing system 103 to make predictions of whether an issue will require a due date revision an/or predictions of whether an issue will fail validation. Computing system 102 may receive issue data for a plurality of issues from risk management system 128 and/or database 126. The issue data for each respective issue of the plurality of issues may include a number of fields including data of different types such as an issue identifier, issue title, and a due date for resolution of the issue. As one example, risk score generating module 120 of computing system 102 may generate due date revision risk scores based on the issue data using one or more machine learning models 122. A due date revision risk score for an issue indicates a predicted probability that a due date for resolution of an issue will be missed or need revision within a fixed period of time, such as 3 months or 6 months. For example, a due date may have to be revised if the issue may not be resolved in time. Such a revision may have significance especially if the issue is a regulatory one, such as the MRAs and MRIAs identified through the Federal Reserve's supervisory process.

As another example, risk score generating module 120 of computing system 102 may generate, based on the plurality of issue data and using one or more machine learning models 122, issue validation risk scores. An issue validation risk score for an issue indicates a predicted probability that a resolution of the issue will fail validation within a fixed period of time, such as 3 months or 6 months. For example, an organization may represent to a regulatory body that an issue is resolved but a review of the resolution by the regulatory body finds a problem and the issue fails validation. Identifying such potential problems allows the organization to give the issue additional attention to attempt to avoid the predicted issue validation failure.

Risk score generating module 120 may use machine learning models 122 to produce predictions of whether an issue will require a due date revision and to produce predictions of whether an issue will fail validation. Machine learning models 122 may receive the inputs, such as the features from feature extraction module 218 discussed below with respect to FIG. 2, to produce predictions of whether an issue will require a due date revision and to produce predictions of whether an issue will fail validation. Details of risk score generating module 120 and machine learning models 122 are described below with respect to risk score generating module 220 and machine learning models 222 of FIG. 2.

Machine learning models 122 may output results into database 124. Database 124 may be a Structured Query Language (SQL) database or other type of storage. Risk score generating module may output the predictions into a file, such as a comma-separated values (CSV) type file. The file may associate the issue identifiers for each of the issues with the generated risk score probabilities for each of the issues. Machine learning models 122 may be periodically, such as once a week, run on data from risk management system to update the risk predictions in the file and dashboards.

Risk warning messaging module 121 at computing system 102 may generate a warning message for issues that have due date revision risk scores and/or issue validation risk scores greater than a threshold. For example, if a due date revision risk score and/or issue validation risk score of an issue is greater than a preset threshold, risk warning messaging module 121 may automatically send an email or other message to relevant users. Computing system 102 may associate issues with a recipient list of one or more relevant users, such as employees, for that issue. Risk warning messaging module 121 may at the appropriate time send messages to users on the associated recipient list. Risk warning messaging module 121 may alternately be located at the computing system 105 that generates the dashboard and the messages may be sent after the risk values are loaded into the dashboard. The threshold may be set by users and may, for example, be different for due date revision risk scores and issue validation risk scores. The messages allow users to be alerted to issues with a high risks of due date revision and/or issue validation failure to allow additional attention to be paid to these issues.

Machine learning model update module 123 may revise parameters of the at least one machine learning model by doing at least one retraining of a machine learning model using updated training data that includes monitored validation failure outcomes and/or due date revision outcomes.

Machine learning model update module 123 may also retune hyperparameters of the at least one machine learning model based on monitored validation failure outcomes and/or due date revision outcomes. Details of machine learning model update module 123 are discussed below with respect to machine learning model update module 223 of FIG. 2.

Computing system 105 may include dashboard generation module 130 to create dashboards for the issues. A dashboard is a graphical user interface that provides visual representations of key data and metrics. Dashboards allows users to easily monitor various performance indicators and make informed decisions. Dashboards may be used in various contexts, such as business intelligence, web analytics, and operational monitoring. The goal of a dashboard is to provide at-a-glance insight into key issues, metrics and trends.

Dashboard generation module 130 may use issue data from risk management system 128 as well as the risk scores generated by risk score generating module 120 of computing system 102 into a single dashboard display as shown in FIGS. 5 and 6 discussed below. The risk scores generated by risk score generating module 120 may be provided in columns of the dashboard in descending order when the column is highlighted in the dashboard. Users may set preferences for the dashboard including a preference to display the dashboard in an order according to one of the risk scores generated by risk score generating module 120. Computing system 105 may store user preferences 132 and then later present the dashboard at one of the user devices 116A-116N according to these user preferences 132.

Dashboard generation unit 130 of computing system 105 may generate data representative of a dashboard for display via a display device, such as one of the user devices 116. The dashboard may indicate one or more issue identifiers of one or more issues of the plurality of issues along with risk scores, such as issue validation risk scores or due date revision risk scores, associated with the one or more issues. Computing system 102 may produce the risk scores for the issues and dashboard generation unit 130 of computing system 105 may then arrange the dashboard display of the issues according to the risk scores as shown in FIGS. 5 and 6 discussed below. The dashboard may indicate a ranking of the one or more issues based on the due date revision risk scores and/or the issue validation risk scores associated with the one or more issues.

The techniques of this disclosure provide one or more technical advantages and practical applications. For example, machine learning models 122 enable automatic predictions of whether an issue will require a due date revision and to produce predictions of whether an issue will fail validation that may not be practical if attempted by users, such as employees. Machine learning models 122 may find hidden patterns in issue data that users wouldn't naturally determine on their own. Machine learning models 122 may handle large volumes of issue data. Machine learning models 122 may also reduce the time required to identify the riskiest issues to follow up on. Machine learning models 122 may help an organization stay on top of the issues from risk management system 128 reducing the threat posed by the issues for an organization. Issues highlighted by the predictions may be brought back on track and/or regulators may be contacted to discuss the issues and warned that the organization is behind schedule. Machine learning models 122 may thus help ensure compliance with key issues. Updating the parameters of machine learning models 122 with risk outcomes allows the machine learning models 122 to adapt to changing issue data and continuously improve their performance over time. This is particularly useful since the data changes frequently. Machine learning models 122 allow for more accurate predictions compared to a rule based ranking systems. Machine learning models 122 may also better handle complex and noisy issue data since the machine learning model 122 may learn to reduce the weights of noisy input features as well as to learn complex interactions of features in multiple categories.

Figure 2:
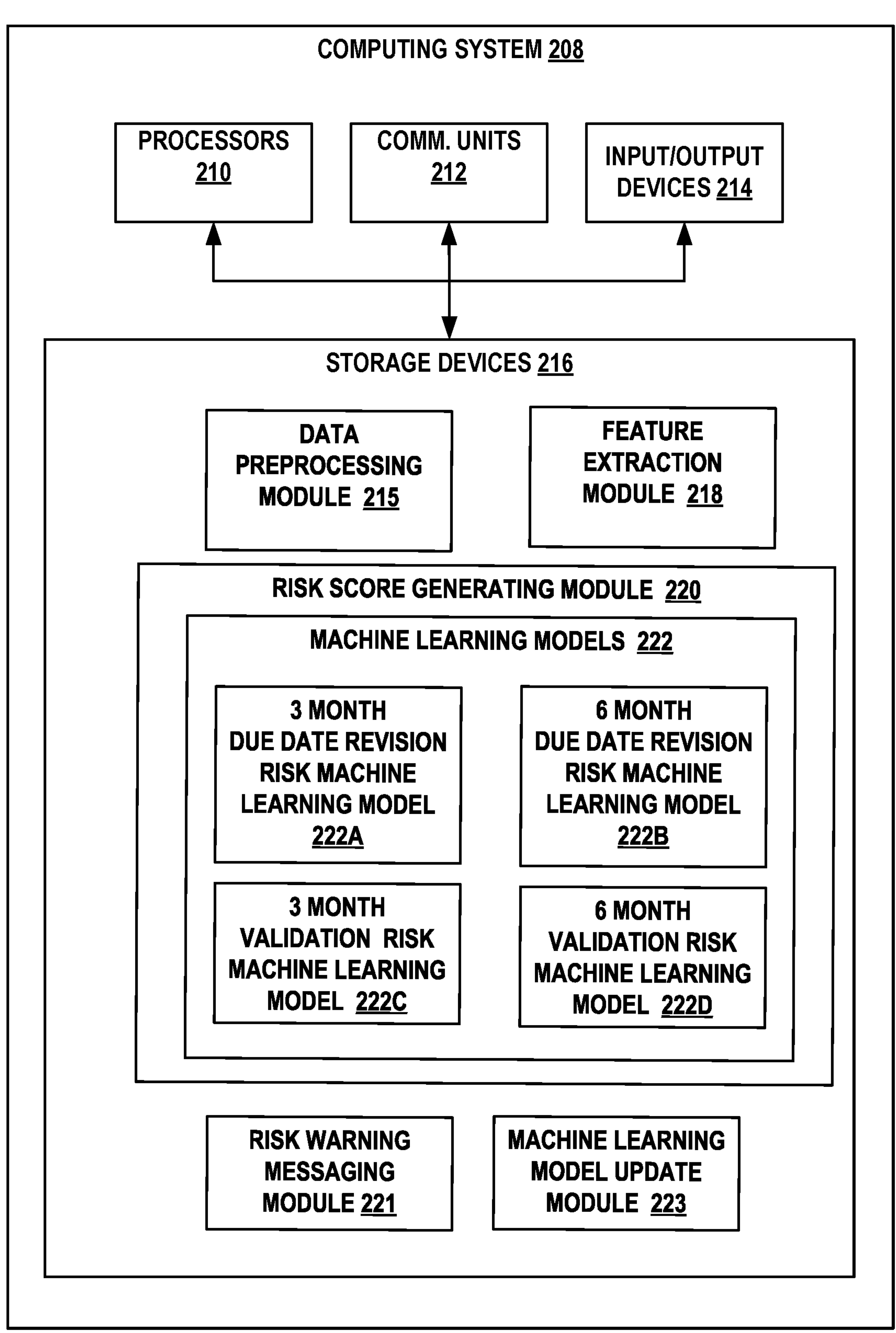
FIG. 2 is a block diagram illustrating an example computing system including a risk score generating module with due date revision risk and validation risk machine learning models, in accordance with one or more aspects of the present disclosure.

FIG. 2 is a block diagram illustrating an example computing system 208 with a risk score generating module including due date risk and validation risk machine learning models, in accordance with one or more aspects of the present disclosure. Computing system 208 may generally correspond to computing system 102 of FIG. 1. Accordingly, the modules of FIG. 2 may perform some or all of the same functions described as being performed by the modules of computing system 102 of FIG. 1.

Computing system 208 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 208 may comprise a server within a data center, cloud computing system, server farm, and/or server cluster (or portion thereof) that provides services to client devices and other devices or systems. For example, computing system 208 may host or provide access to services provided by one or more applications and/or modules running on computing system 208.

Although computing system 208 of FIG. 2 is illustrated as a stand-alone device, in other examples computing system 208 may be implemented in any of a wide variety of ways, and may be implemented using multiple devices and/or systems. In some examples, computing system 208 may be, or may be part of, any component, device, or system that includes a processor or other suitable computing environment for processing information or executing software instructions and that operates in accordance with one or more aspects of the present disclosure. In some examples, computing system 208 may be fully implemented as hardware in one or more devices or logic elements.

In the example of FIG. 2, computing system 208 may include one or more processors 210, one or more communication units 212, one or more input/output devices 214, and one or more storage devices 216. One or more of the devices, modules, storage areas, or other components of computing system 208 may be interconnected to enable inter-component communications (physically, communicatively, and/or operatively). In some examples, such connectivity may be provided by communication channels, a system bus, a network connection, an inter-process communication data structure, or any other method for communicating data. A power source (not shown) may provide power to one or more components of computing system 208. In some examples, the power source may receive power from the primary alternative current (AC) power supply in a commercial building or data center, where some or all of an enterprise network may reside. In other examples, the power source may be or may include a battery.

One or more processors 210 of computing system 208 may implement functionality and/or execute instructions associated with computing system 208 associated with one or more modules illustrated herein and/or described below. One or more processors 210 may be, may be part of, and/or may include processing circuitry that performs operations in accordance with one or more aspects of the present disclosure. In some examples, two or more processors included in processors 210 may each perform different portions of the operations described herein. Examples of processors 210 include microprocessors, application processors, display controllers, auxiliary processors, one or more sensor hubs, and any other hardware configured to function as a processor, a processing unit, or a processing device. Computing system 208 may use one or more processors 210 to perform operations in accordance with one or more aspects of the present disclosure using software, hardware, firmware, or a mixture of hardware, software, and firmware residing in and/or executing at computing system 208.

One or more communication units 212 of computing system 208 may communicate with devices external to computing system 208 by transmitting and/or receiving data, and may operate, in some respects, as both an input device and an output device. In some examples, communication units 212 may communicate with other devices over a network. In other examples, communication units 212 may send and/or receive radio signals on a radio network such as a cellular radio network. In other examples, communication units 212 of computing system 208 may transmit and/or receive satellite signals on a satellite network such as a Global Positioning System (GPS) network. Examples of communication units 212 include a network interface card (e.g., such as an Ethernet card), an optical transceiver, a radio frequency transceiver, a GPS receiver, or any other type of device that can send and/or receive information. Other examples of communication units 212 may include devices capable of communicating over Bluetooth®, GPS, near field communication (NFC), ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 214 may represent any input or output devices of computing system 208 not otherwise separately described herein. One or more input/output devices 214 may generate, receive, and/or process input from any type of device capable of detecting input from a human or machine. One or more input/output devices 214 may generate, present, and/or process output through any type of device capable of producing output.

One or more storage devices 216 within computing system 208 may store information for processing during operation of computing system 208. Storage devices 216 may store program instructions and/or data associated with one or more of the modules described in accordance with one or more aspects of this disclosure. One or more processors 210 and one or more storage devices 216 may provide an operating environment or platform for such modules, which may be implemented as software, but may in some examples include any combination of hardware, firmware, and software. One or more processors 210 may execute instructions and one or more storage devices 216 may store instructions and/or data of one or more modules. The combination of processors 210 and storage devices 216 may retrieve, store, and/or execute the instructions and/or data of one or more applications, modules, or software. Processors 210 and/or storage devices 216 may also be operably coupled to one or more other software and/or hardware components, including, but not limited to, one or more of the components of computing system 208 and/or one or more devices or systems illustrated as being connected to computing system 208.

In some examples, one or more storage devices 216 are temporary memories, meaning that a primary purpose of the one or more storage devices is not long-term storage. Storage devices 216 of computing system 208 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 216, in some examples, also include one or more computer-readable storage media. Storage devices 216 may be configured to store larger amounts of information than volatile memory. Storage devices 216 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

In accordance with the disclosed techniques, storage devices 216 may store modules including data preprocessing module 215, feature extraction module 218, risk score generating module 220, machine learning models 222, machine learning model update module 223 and risk warning messaging module 221. The stored machine learning models 222 may include machine learning models that produce risk scores such as three month due date revision risk machine learning model 222A, six month due date revision risk machine learning model 222B, three month validation risk machine learning model 222C, and six month validation risk machine learning model 222D.

Data preprocessing module 215 at computing system 208 may preprocess issue data from a risk management system. Raw data have a wide range of types including numbers, strings, dates, and texts. Data preprocessing module 215 may preprocess issue data by creating one or more variables from raw data (such as from risk management system 128 of FIG. 1) of the issue data for the plurality of issues. The one or more variables may include one or more of numeric, categorical, or text variables. Data preprocessing module 215 may clean up the issue data with respect to the formatting and ranges. For example, data preprocessing module 215 may convert multiple data formats into a single consistent date format and ensure that the input issue data is within a valid range.

Feature extraction module 218 may process one or more variables created from the issue data for the plurality of issues into one or more features to be used as input to the machine learning models. Feature extraction module 218 may input and scale numeric variables, encode categorical variables, and produce numeric presentations of text variables, such as by using Term Frequency Inverse Document Frequency (TFIDF).

Categorical variables are a type of data that consists of discrete, non-continuous values that belong to a specific category or class. Feature extraction module 218 may generating categorical features by encoding categorical variables created from the issue data for the plurality of issues. Feature extraction module 218 may encode categorical data into ordinal values. For example, feature extraction module 218 may encode data of a "status" field that has 6 valid string values as one of six ordinal values, such as 1, 2, 3, 4, 5, and 6.

Numeric variables may take on any value within a range, such as temperature, time, or weight. Feature extraction module 218 may generating numeric features, as part of feature extraction, by imputing and scaling numeric variables created from the issue data for the plurality of issues. For example, feature extraction module 218 may constrain the numeric variables between a minimum and a maximum value, such as between 0 and 1, to more easily train machine learning models 222. For example, if an issue has a "days till due" field that typically ranges from zero to 1000 days, feature extraction module 218 may constrain the "days till due" feature between 0 and 1 by dividing by 1000. Feature extraction module 218 may create a numeric value of days until due date by taking the difference between the current due date and the current date. Feature extraction module 218 may also covert dates into numeric date values with respect to a fixed date fixed date, such as Jan. 1, 2018, by taking the difference between a value and the fixed date.

Text variables are a type of data that consists of unstructured textual information such as descriptions of issues or issue titles. Feature extraction module 218 may convert text variables to a numeric representation. For example, feature extraction module 218 may, as part of feature extraction, produce term frequency-inverse document frequency (TFIDF) vectors from text variables created from the issue data for the plurality of issues. The TFIDF vectors comprise numeric presentations of the text variables.

TFIDF is a statistical measure used to evaluate the importance of a word in a document within a collection of documents. Feature extraction module 218 may calculate TFIDF vectors as the product of the term frequency (TF), which is the number of times a word appears in a document, and the inverse document frequency (IDF), which is a measure of how rare the word is across all the documents in the collection. The tokens for the TFIDF vectors may be determined as part of model training. In one example, the number of tokens for the TFIDF vectors supplied to machine learning models 222 may be reduced during training in a process of backward selection to increase accuracy by removing irrelevant tokens.

Feature extraction module 218 may use input data including some of the features shown in the example dashboard displays of FIGS. 5 and 6 such as issue title 508 and 608, source 510 and 610, severity rating 512 and 612, issue status 514 and 614, issue over all validation status 516 and 616 to create variables for machine learning models 222. Feature extraction module 218 may use input data from the risk management system 103 of FIG. 1 not shown in the example dashboard displays of FIGS. 5 and 6.

In one example, Feature extraction module 218 may use input data from the risk management system 128 of FIG. 1 to create numeric features such as original days until due (calculated as original due date minus creation date); current days until due (calculated as current due date minus a current day); days added when revised (calculated as revised due date minus original due date); number of corrective actions; average days until due for each corrective action (based on original days until due); number of revised corrective actions; number of corrective actions completed after due date; number of corrective actions with completed validation date; number of corrective actions with completed work date; number of corrective actions with completed date; and months on book. Feature extraction module 218 may derive categorical features from input data from the risk management system 128 of FIG. 1 including the fields issue at risk, issue risk level name, issue status name. Feature extraction module 218 may derive features, such as the TFIDF vectors, from input text data from the risk management system 128 including the text fields, issue status comments, issue description, corrective action status comment, and corrective action description.

Risk score generating module 220 may use machine learning models 222 to produce predictions of whether an issue will require a due date revision and to produce predictions of whether an issue will fail validation. Machine learning models 222 may receive features from feature extraction module 218 to produce predictions of whether an issue will require a due date revision and to produce predictions of whether an issue will fail validation.

Machine learning models 222 may be a random forest models that use multiple predictive elements, such as decision trees, to make predictions. For example, if there are 100 predictive elements, such as decision trees, in a random forest model and 80% of the decision trees indicate that an issue will fail and 20% indicate success than an output probability may be set as 80%.

Random forest models are an ensemble learning method that uses multiple decision trees to make predictions. The "forest" in the name refers to a collection of decision trees, and the term "random" refers to the randomness used when building the trees. Machine learning models 222 may use other types of machine learning models rather than random forest models such as logistic regression models, Support Vector Machines (SVM), gradient boosting and or other model types.

In a random forest model, a number of predictive elements, such as decision trees, may be trained on random subsets of the data, and the final prediction is made by taking a majority vote from all the individual trees. This makes the model highly robust and less prone to overfitting compared to a single decision tree. Overfitting may occur when there is a large variance (a measure of how much a model's predictions vary for different training sets). Since Random Forest model combines predictions from multiple decision trees to make the final prediction the impact of individual decision trees that may have overfit the training data is reduced. Hyperparameters for the Random Forest models may include maximum depth (number of splits that each decision tree is allowed to make) and the number of decision trees in the random forest.

Random forest models may include an ensemble of predictive elements, such as decision trees. The decision trees of the random forest model maybe trained with the training data so that the decision trees learn features, such as terms in a TFIDF vector, that indicate risks such as potential issue validation failures or potential due date revisions. For example, terms such as such as "unsuccessful", "extend", or "red" in the input data may be indicative of due date revision risk. Feature extraction module 218 may encode such terms as part of features such as the TFIDF vectors discussed above.

To determine the issue validation risk scores for issues, random forest models may include an ensemble of predictive elements where each predictive element determines whether the resolution of the respective issue will fail validation within a fixed period of time based on one or more features of the issue data for the respective issue. The issue validation risk score for the respective issue may comprise a percentage of the predictive elements that determined that the resolution of the respective issue will fail validation within the fixed period of time.

To determine due date revision risk scores for issues, random forest models may include an ensemble of predictive elements. Each predictive element may determine whether the due date will need to be revised within the fixed period of time based on one or more features of the issue data for the respective issue. The due date revision risk score for the respective issue may comprise a percentage of the predictive elements that determined that the due date would need to be revised within the fixed period of time.

Machine learning models 122 may output probabilities, such as in percentages. For example, if there are 100 predictive elements, such as decision trees, in a random forest model and 80% of the decision trees indicate that an issue will fail and 20% indicate success than an output probability may be 80%. Alternately, each predictive element may produce an individual probability prediction and the individual probability predictions combined to produce a single probability prediction output. Probabilities as an output may have advantages over hard classifiers such as a prediction of failure or success. For example, probabilities may allow for ranking and comparison of issues risks.

The training of machine learning model(s) 222 may include an analysis of historical data including issue data from the risk management system 128 of FIG. 1 as well as issue outcomes such as issue validation success or failure and due date revision data. For the historical data, target variables related to outcomes (e.g., 1 if the revision or failure event occurred, and 0 if not) are used to train the parameters of machine learning model(s) 222. During training, the performance of machine learning model(s) 222 may be evaluated by comparing the predicted outcomes with the actual outcomes on the testing data using various evaluation metrics such as accuracy, precision, recall and/or machine learning metrics such as an F1-score. Computing system 208, or other computing system, may train machine learning models multiple times using multiple different algorithms, hyperparameters and arrangements to select a well performing machine learning model as machine learning model(s) 222.

Once machine learning models 222 are trained, feature importance analysis may determine features of the issue data, such as the fields and/or tokens within the fields, that most affect the model results. Feature importance analysis may calculate the importance of each feature and rank them to see what features are most important to the model. Such feature importance analysis may be used check the reasonableness of the machine learning models 222.

FIG. 2 shows four machine learning models 222. Machine learning models 222 may produce risk scores with respect to fixed periods of time. Using fixed periods of time helps the machine learning model learn the important features of the issue data and make consistent predictions. Multiple machine learning models may predict risk scores over multiple fixed periods of time. In the example of FIG. 2, fixed periods of time of 3 months and 6 months are used. Using multiple fixed periods of time allows for an evaluation of the risks at different lengths of time while still allowing the models to learn consistently. Computing system 208 may produce the risk scores using the multiple models in parallel.

Three month due date revision risk machine learning model 222A produces risk scores for each of the issues with respect to the risk of a due date revision within a first fixed period of time, in this example within three months. The date revisions risk score for the respective issues indicates a predicted probability that the due date for resolution of the respective issue will need revision within the first fixed period of time. The risk of a due date revision within the fixed period of time may be associated with the issue identifier and stored in a file to be used to produce a dashboard.

Six month due date revision risk machine learning model 222B produces risk scores for each of the issues with respect to the risk of a due date revision within a second fixed period of time greater than the first fixed period of time, in this example within six months. The date revisions risk score for the respective issues indicates a predicted probability that the due date for resolution of the respective issue will need revision within the second fixed period of time. The risk of a due date revision within the second fixed period of time may be associated with the issue identifier and stored in a file to be used to produce a dashboard.

Three month validation risk machine learning model 222C produces risk scores for each of the issues with respect to the risk of a validation failure within a first fixed period of time, in this example within three months. The issue validation risk score for the respective issue indicates a predicted probability that the resolution of the respective issue will fail validation within the fixed period of time. The risk of a validation failure within the fixed period of time may be associated with the issue identifier and stored in a file to be used to produce a dashboard.

Six month validation risk machine learning model 222D produces risk scores for each of the issues with respect to the risk of a validation failure within a second fixed period of time greater than the first fixed period of time, in this example within six months. The second issue validation risk score for the respective issue indicates a predicted probability that the resolution of the respective issue will fail validation within the second fixed period of time. The risk of a validation failure within the second fixed period of time may be associated with the issue identifier and stored in a file to be used to produce a dashboard.

Risk warning messaging module 221 may generate warning messages for issues that have due date revision risk scores and/or issue validation risk scores greater than a threshold. For example, if a due date revision risk score and/or issue validation risk score of an issue is greater than a preset threshold, risk warning messaging module 221 may send an email or other message to relevant users. An issue may be associated with a recipient list of one or more relevant users for that issue. Risk warning messaging module 221 may at the appropriate time send messages to the associated recipient list. Risk warning messaging module 221 may alternately be located at a computing system that generates the dashboard (such as computing system 300 shown in FIG. 3) and the messages sent after the risk values are loaded into the dashboard. The threshold may be set by users and may, for example, be different for due date revision risk scores and for issue validation risk scores. Such a message allows user to be alerted to issues with a high risks of due date revision and/or issue validation failure.

Machine learning model update module 223 may revise parameters of the machine learning model based on due date revision outcomes and/or issue validation outcomes. For example, if a high due date revision risk score does not result in a failure as a due date revision outcome, machine learning model update module 123 may adjust the parameters of machine learning model(s) 122 so that in the future a similar issue will have a lower due date revision risk score. Such an update of the machine learning model(s) 122 may be considered a type of post-production model training, such as continual learning.

Computing system 208 may monitor the outcomes of the issues for which a prediction was made during production (e.g., 1 if the revision or failure event occurred, and 0 if not). Due date revision outcomes of an issue may be the existence or non-existence of a due date revision, such as in the fixed period. Issue validation outcome of an issue may be the existence or non-existence of an issue validation failure, such as in a fixed period. Computing system 208 may also track Key Performance Indicators (KPIs) such as percentage issue failure over time, percentage of due dates misses, revised due dates and number of revisions with respect to the risk scores. Historical outcomes may also be tracked to determine if the risk scores and/or interventions resulted in changes.

Computing system 208 may monitor performance of the machine learning models 222 over time including monitoring the validation failure outcomes (validation failure outcomes comprising one or more of failed validations or passed validations) and due date revision outcomes (due date revision outcomes comprising one or more of revised due dates, missed due dates with or without due date revision, or achieved due dates with or without due date revision) for the plurality of issues for which warning messages were generated.

Computing system 208 may use the monitored data to update parameters of the machine learning models. Machine learning model update module 223 may revise parameters of the at least one machine learning model by doing at least one retraining of a machine learning model using updated training data that includes the monitored validation failure outcomes and/or due date revision outcomes. Machine learning model update module 223 may also retune hyperparameters of the at least one machine learning model based on the monitored validation failure outcomes and/or due date revision outcomes.

For example, if there is a high due date revision risk score that does not result in a due date revision for the issue, machine learning model update module 223 may adjust the parameters of machine learning model(s) 222 so that in the future a similar issue will have a lower due date revision risk score. Such an update of the machine learning model(s) 222 may be a type of post-production model training, such as continual learning. In addition to the due date revision outcomes and/or issue validation outcomes, the computing system 208 may use additional features as part of the revision of parameters. For example, such additional features may include features concerning the level of modified organizational attention as a result of the due date revision risk scores and issue validation risk scores. Increased organizational attention, such as increased employee work hours or increased managerial review on an issue, as a result of high risk scores may lead to the paradoxical result that issue outcomes are better than predicted because of the increased organizational attention. Thus, a naive revision of parameters of the machine learning model may tend to reduce the due date revision risk scores and issue validation risk scores in the future. Issues may be tagged if they receive heightened scrutiny as a result of a high due date revision risk score and/or issue validation risk score. Issues may also be tagged if they are the subject of a warning message. Such tags may be used in the updating of the parameters during training. For example, tagged issues may be excluded from the parameter update process by machine learning model update module 223 or the tags may be used as feature inputs to the machine learning model training by machine learning model update module 223. Additionally, if employee hours are tracked per issue, the employee hours per issue may also be used in updating the parameters.

Modules illustrated in FIG. 2 (e.g., data preprocessing module 215, feature extraction module 218, risk score generating module 220, and machine learning models 222 such as three month due date revision risk machine learning model 222A, six month due date revision risk machine learning model 222B, three month validation risk machine learning model 222C, six month validation risk machine learning model 222D, machine learning model update module 223 and risk warning messaging module 221) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
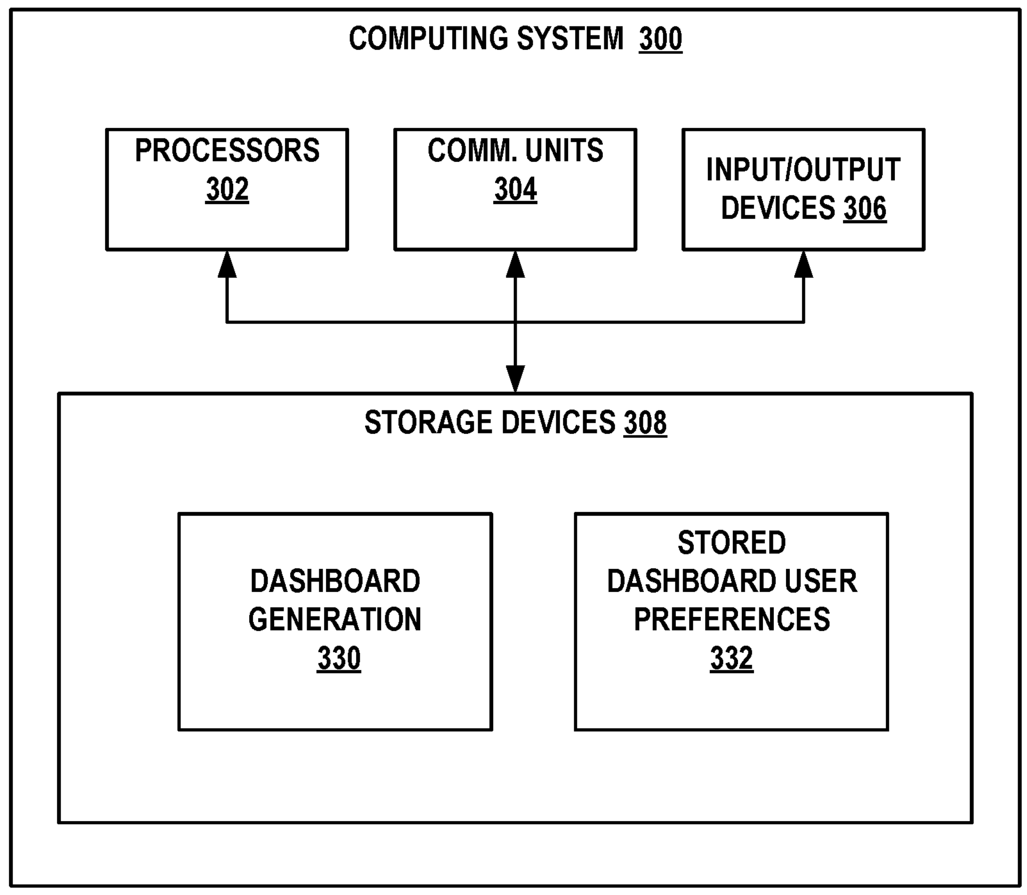
FIG. 3 is a block diagram illustrating an example computing system including a dashboard generation module, in accordance with one or more aspects of the present disclosure.

FIG. 3 is a block diagram illustrating example computing system 300 including a dashboard generation unit, in accordance with one or more aspects of the present disclosure. Computing system 300 includes dashboard generating module 330 to produce dashboards such as the dashboards of FIGS. 6 and 7. Computing system 300 may generally correspond to computing system 105 of FIG. 1. Accordingly, Computing system 300 may perform some or all of the same functions described in connection with FIG. 1 as being performed by computing system 105.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300—may comprise a server within a data center, cloud computing system, server farm, and/or server cluster (or portion thereof) that provides services to client devices and other devices or systems. For example, computing system 300 may host or provide access to services provided by one or more applications and/or modules running on computing system 300.

Although computing system 300 of FIG. 3 is illustrated as a stand-alone device, in other examples computing system 300 may be implemented in any of a wide variety of ways, and may be implemented using multiple devices and/or systems. In some examples, computing system 300 may be, or may be part of, any component, device, or system that includes a processor or other suitable computing environment for processing information or executing software instructions and that operates in accordance with one or more aspects of the present disclosure. In some examples, computing system 300 may be fully implemented as hardware in one or more devices or logic elements.

In the example of FIG. 3, computing system 300 may include one or more processors 302, one or more communication units 304, one or more input/output devices 306, and one or more storage devices 308. One or more of the devices, modules, storage areas, or other components of computing system 300 may be interconnected to enable inter-component communications (physically, communicatively, and/or operatively). In some examples, such connectivity may be provided by through communication channels, a system bus, a network connection, an inter-process communication data structure, or any other method for communicating data. A power source (not shown) may provide power to one or more components of computing system 300. In some examples, the power source may receive power from the primary alternative current (AC) power supply in a commercial building or data center, where some or all of an enterprise network may reside. In other examples, the power source may be or may include a battery.

One or more processors 302 of computing system 300 may implement functionality and/or execute instructions associated with computing system 300 associated with one or more modules illustrated herein and/or described below. One or more processors 302 may be, may be part of, and/or may include processing circuitry that performs operations in accordance with one or more aspects of the present disclosure. Examples of processors 302 include microprocessors, application processors, display controllers, auxiliary processors, one or more sensor hubs, and any other hardware configured to function as a processor, a processing unit, or a processing device. Computing system 300 may use one or more processors 302 to perform operations in accordance with one or more aspects of the present disclosure using software, hardware, firmware, or a mixture of hardware, software, and firmware residing in and/or executing at computing system 300.

One or more communication units 304 of computing system 300 may communicate with devices external to computing system 300 by transmitting and/or receiving data, and may operate, in some respects, as both an input device and an output device. In some examples, communication units 304 may communicate with other devices over a network. In other examples, communication units 304 may send and/or receive radio signals on a radio network such as a cellular radio network. In other examples, communication units 304 of computing system 300 may transmit and/or receive satellite signals on a satellite network such as a Global Positioning System (GPS) network. Examples of communication units 304 include a network interface card (e.g., such as an Ethernet card), an optical transceiver, a radio frequency transceiver, a GPS receiver, or any other type of device that can send and/or receive information. Other examples of communication units 304 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 306 may represent any input or output devices of computing system 300 not otherwise separately described herein. One or more input/output devices 306 may generate, receive, and/or process input from any type of device capable of detecting input from a human or machine. One or more input/output devices 306 may generate, present, and/or process output through any type of device capable of producing output.

One or more storage devices 308 within computing system 300 may store information for processing during operation of computing system 300. Storage devices 308 may store program instructions and/or data associated with one or more of the modules described in accordance with one or more aspects of this disclosure. One or more processors 302 and one or more storage devices 308 may provide an operating environment or platform for such modules, which may be implemented as software, but may in some examples include any combination of hardware, firmware, and software. One or more processors 302 may execute instructions and one or more storage devices 308 may store instructions and/or data of one or more modules. The combination of processors 302 and storage devices 308 may retrieve, store, and/or execute the instructions and/or data of one or more applications, modules, or software. Processors 302 and/or storage devices 308 may also be operably coupled to one or more other software and/or hardware components, including, but not limited to, one or more of the components of computing system 300 and/or one or more devices or systems illustrated as being connected to computing system 300.

In some examples, one or more storage devices 308 are temporary memories, meaning that a primary purpose of the one or more storage devices is not long-term storage. Storage devices 308 of computing system 300 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 308, in some examples, also include one or more computer-readable storage media. Storage devices 308 may be configured to store larger amounts of information than volatile memory. Storage devices 308 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

In accordance with the disclosed techniques, storage devices 308 may store modules including dashboard generation module 330 and stored dashboard preferences 332. According to the disclosed techniques, dashboard generation module 330 may generate data representative of a dashboard, such as the dashboards shown in FIGS. 6 and 7 discussed below, for display via a display device of one or more of user devices 116A-116N of FIG. 1. The dashboards produced by dashboard generation module 330 may include indications of issue data from risk management system 128 of FIG. 1 as well as indications of the risk scores generated by risk score generating module 120 of computing system 102 of FIG. 1 in a single dashboard display as shown in FIGS. 5 and 6 discussed below. The risk scores generated by risk score generating module 120 of FIG. 1 may be provided in columns of the dashboard. Dashboard generation module 330 may receive user inputs from user devices 116A-116N of FIG. 1 and use these inputs, as well as stored dashboard user preferences 332, to control the generated dashboard displays. For example, dashboard generation module 330 may automatically order the issues according to one of the risk scores, such as in a descending order based on the risk scores. Users may set preferences for the dashboard and the user preferences may be stored as user preferences 332 or at user device 116 of FIG. 1.

Figure 4:
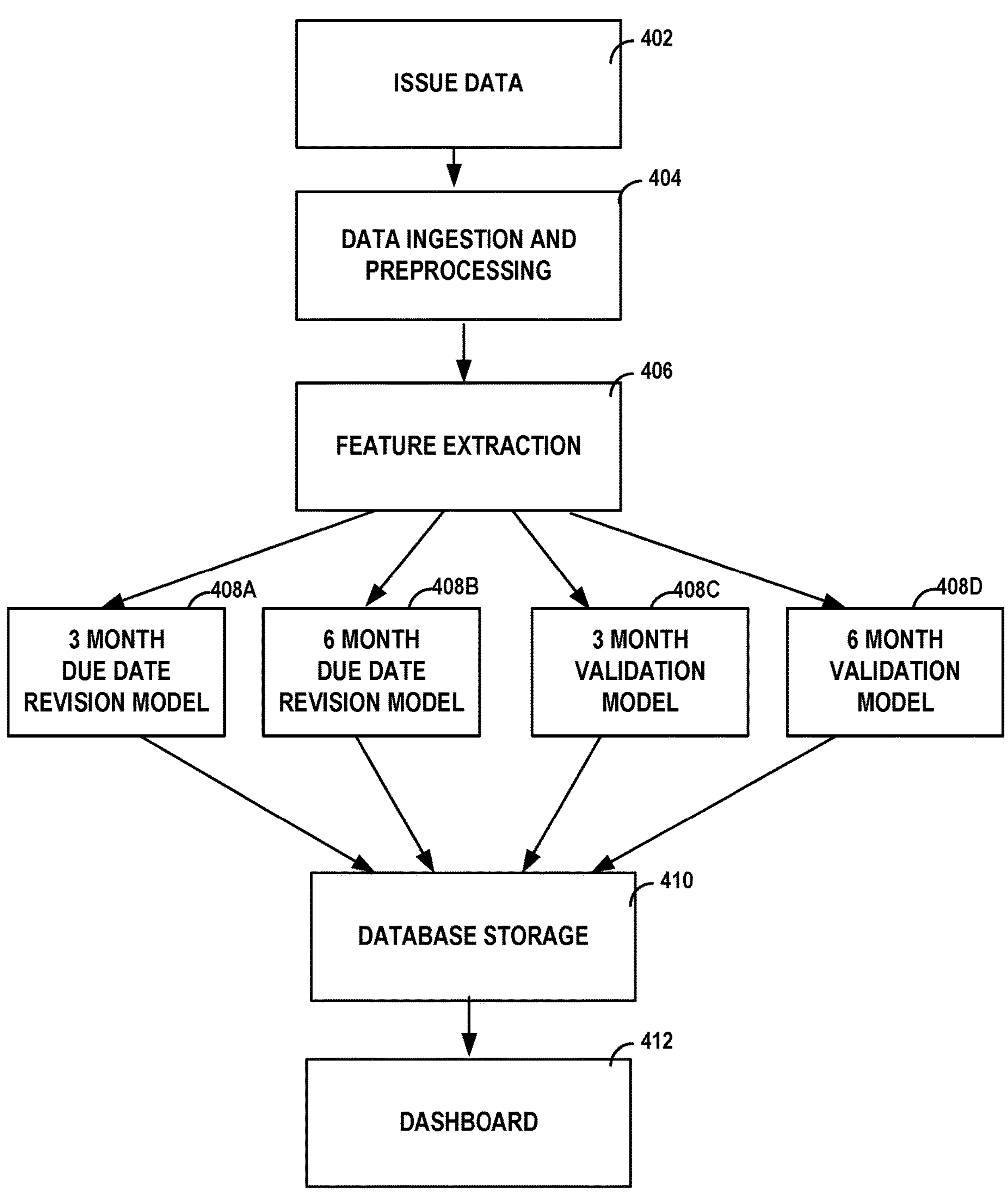
FIG. 4 is a flow diagram that illustrate the operation of a risk score generating module with due date revision risk and issue validation risk machine learning models, in accordance with one or more aspects of the present disclosure.

FIG. 4 is a flow diagram that illustrates the operation of a risk score generating module with due date revision risk and issue validation risk machine learning models, in accordance with one or more aspects of the present disclosure. The operations of FIG. 4 are described within the context of computing system 102 from FIG. 1.

Computing system 102 may retrieve issue data from a risk management system (402). Computing system 102 may then ingest and preprocess issue data to clean the issue data (404). Computing system 102 may extract inputs for machine learning models (406). Computing system 102 may send the inputs to one or more of the machine learning models in parallel (408). Computing system 102 may use three month due date revision risk machine learning model (408A), six month due date revision risk machine learning model (408B), three month validation risk machine learning model (408C), and/or six month validation risk machine learning model (408D) to produce due date revision risk scores and issue validation risk scores. Computing system 102 may store the risk scores from the machine learning models into a database (410). A computing system may create a dashboard using the risk scores as shown in FIGS. 5 and 6 (412).

FIG. 5 is a diagram illustrating an example dashboard user interface produced by a dashboard generation module that displays due date revision risk scores, in accordance with one or more aspects of the present disclosure. The dashboard of FIG. 5 may be created by dashboard generation module 130 at computing system 105 using issue data from risk management system 128 of computing system 103 and the risk scores produced by computing system 102.

"Revised due date 3 month" column 502 displays the three month due date revision risk scores such as those produced by three month due date revision risk machine learning model 222A of FIG. 2. "Revised due date 6 month" column 504 displays the six month due date revision risk scores such as those produced by six month due date revision risk machine learning model 222B of FIG. 2. Other columns of the dashboard display show issue data received from risk management system 128. Column 506 displays the Issue Identifiers. Dashboard generation module 130 at computing system 105 may use the issue Identifiers to associate the risk scores from the risk scores from the machine learning models with other issue data from risk management system 128. Other columns of the dashboard of FIG. 5 include Issue Title 508, Source 510 (an indication of where the issue arises from), severity rating 512 (a human generated assessment of the risk level of the issue), issue status 514 (an indication of the general status of the issue), and Issue overall validation status (an indication of the status of the issue with respect to validation). Other issue fields not shown in FIG. 5 may also be used.

The dashboard indicates a ranking of the issues based on the risk scores such that those issues with higher risk score are listed first. In the example of FIG. 5 the issues are ranked according to "revised due date 3 month" column 502 in descending order. This allows users to quickly identify those issues with high risk scores and understand an order or priority in which the issues should be investigated and the due dates revised as necessary.

FIG. 6 is a diagram illustrating an example dashboard user interface generated by a dashboard generation module to produce a risk rated issue dashboard that displays issue validation risk scores, in accordance with one or more aspects of the present disclosure. The dashboard of FIG. 6 may be created by dashboard generation module 130 at computing system 105 using issue data from risk management system 128 of computing system 103 and the risk scores produced by computing system 102.

"Failed validation 3 month" column 602 displays the risk scores for three month validation risk scores such as those produced by three month validation risk machine learning model 222C of FIG. 2. "Failed validation 6 month" column 604 displays the six month validation risk scores such as those produced by six month validation risk machine learning model 222D of FIG. 2. Other columns of the dashboard of FIG. 6 show issue data received from risk management system 128. Column 606 displays the Issue Identifiers. Other columns includes Issue Title 608, Source 610 (an indication of where the issue arises from), severity rating 612 (a human generated assessment of the risk level of the issue), issue status 614 (an indication of the general status of the issue), and Issue overall validation status (an indication of the status of the issue with respect to validation). Other issue fields not shown in FIG. 6 may also be used. The dashboard indicates a ranking of the issues based on the risk scores such that those issues with higher risk score are listed on top. In the example of FIG. 6, the issues are ranked according to "failed validation 3 month" column 602 in descending order. This allows users to find issues with high risk scores and understand an order or priority in which the issues should be investigated and resolved.

Figure 7:
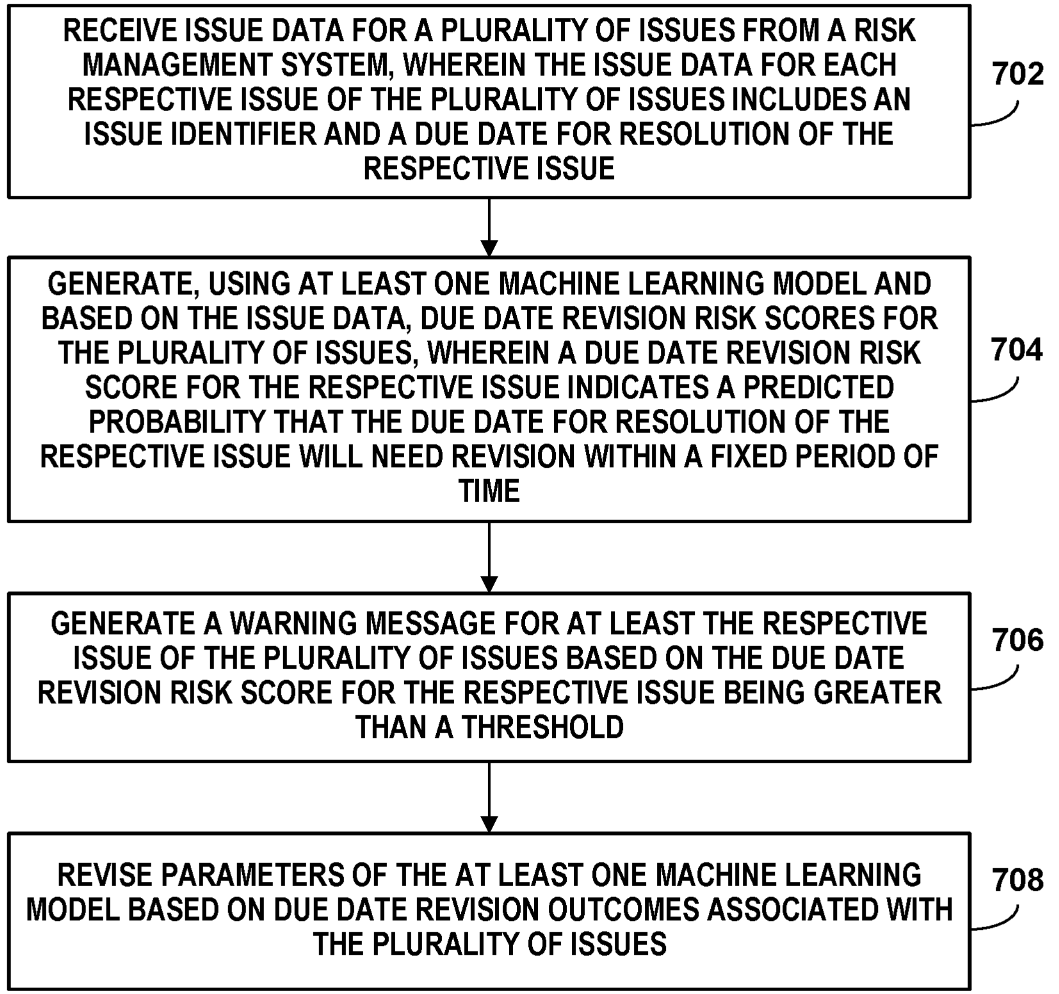
FIG. 7 is a flow diagram illustrating operations performed by an example computing system to produce due date revision risk scores, in accordance with one or more aspects of the present disclosure.

FIG. 7 is a flow diagram illustrating operations performed by an example computing system to produce due date revision risk scores, in accordance with one or more aspects of the present disclosure. The operations of FIG. 7 are described within the context of computing system 102 from FIG. 1. In other examples, operations described in FIG. 7 may be performed by computing system 208 of FIG. 2, or one or more other components, modules, systems, or devices. Further, in other examples, operations described in connection with FIG. 7 may be merged, performed in a difference sequence, or omitted.

Computing system 102 may receive issue data for a plurality of issues from a risk management system, wherein the issue data for each respective issue of the plurality of issues includes an issue identifier and a due date for resolution of the respective issue (702). The issue identifier may associate generated risk scores with the issues. Computing system 102 may generate, using a machine learning model and based on the issue data, due date revision risk scores for the plurality of issues, wherein a due date revision risk score for the respective issue indicates a predicted probability that the due date for resolution of the respective issue will need revision within a fixed period of time (704). The generated due date revision risk scores may be percentage value, for example. Computing system 102 may generate a warning message for at least the respective issue of the plurality of issues based on the due date revision risk score for the respective issue being greater than a threshold (706). The warning message may be sent to users to warn them about the issue. Computing system 102 may revise parameters of the at least one machine learning model based on due date revision outcomes associated with the plurality of issues (708). Such a revision of the parameters may improve the accuracy of the machine learning models.

Figure 8:
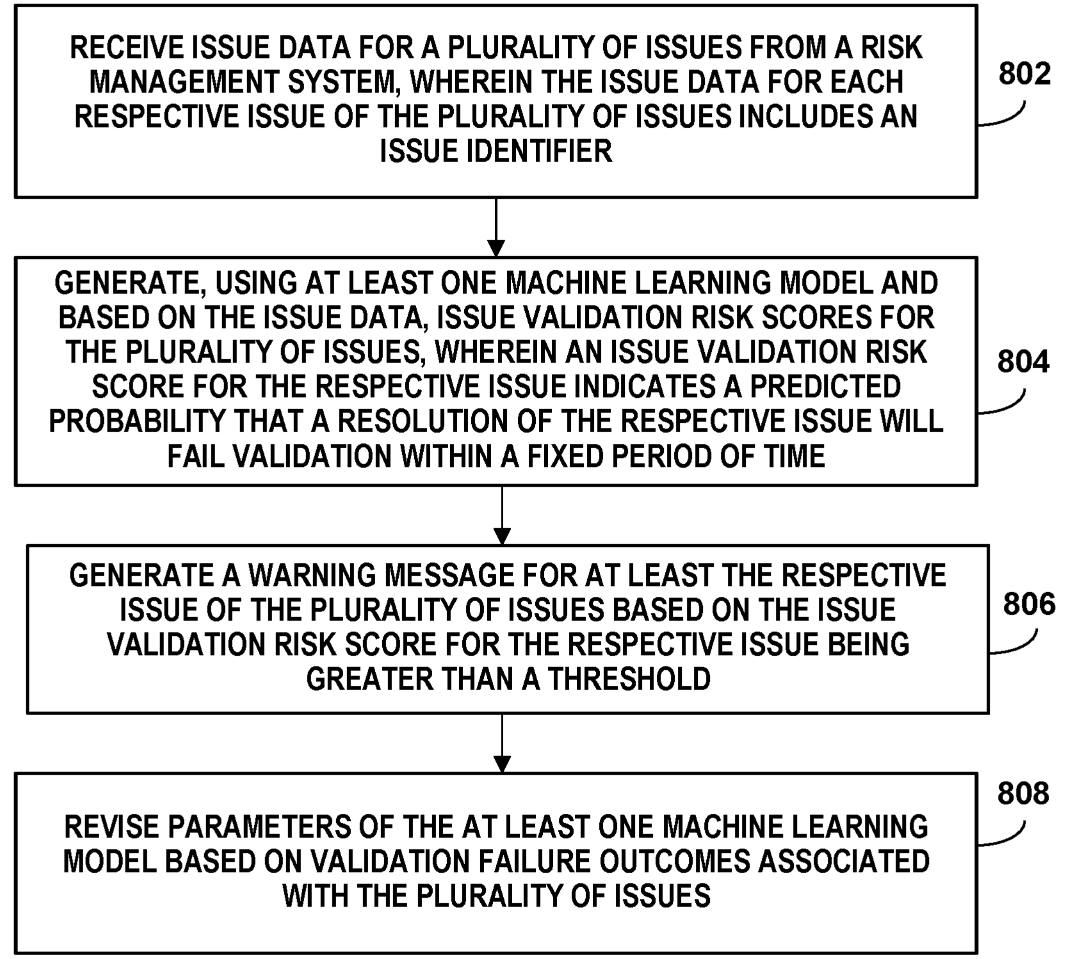
FIG. 8 is a flow diagram illustrating operations performed by an example computing system to produce issue validation risk scores, in accordance with one or more aspects of the present disclosure.

FIG. 8 is a flow diagram illustrating operations performed by an example computing system to produce issue validation risk scores, in accordance with one or more aspects of the present disclosure. The operations of FIG. 8 are described within the context of computing system 102 from FIG. 1. In other examples, operations described in FIG. 8 may be performed by computing system 208 of FIG. 2, or one or more other components, modules, systems, or devices. Further, in other examples, operations described in connection with FIG. 8 may be merged, performed in a difference sequence, or omitted.

Computing system 102 may receive issue data for a plurality of issues from a risk management system, wherein the issue data for each respective issue of the plurality of issues includes an issue identifier (802). The issue identifier may associate generated risk scores with the issues. Computing system 102 may generate, using a machine learning model and based on the issue data, issue validation risk scores for the plurality of issues, wherein an issue validation risk score for the respective issue indicates a predicted probability that a resolution of the respective issue will fail validation within a fixed period of time (804). The generated issue validation risk scores may be percentage value, for example. Computing system 102 may generate a warning message for at least the respective issue of the plurality of issues based on the issue validation risk score for the respective issue being greater than a threshold (806). The warning message may be sent to users to warn them about the issue. Computing system 102 may revise parameters of the at least one machine learning model based on validation failure outcomes associated with the plurality of issues (808). Such a revision may improve the accuracy of the machine learning models.

By way of example and not limitation, such computer-readable storage media may include RAM, ROM, EEPROM, CD-ROM, or other optical disk storage, magnetic disk storage, or other magnetic storage devices, flash memory, cache memory, or any other medium that can be used to store desired program code in the form of instructions or store data structures and that can be access by a computer. Also, any connection is a properly termed a computer-readable medium. For example, if instructions are transmitted from a website, server, or other remote source using a coaxial cable, fiber optic cable, twisted pair, digital subscriber line (DSL), or other wireless technologies such as infrared, radio, and microwave, then the coaxial cable, fiber optic cable, twisted pair, DSL, or other wireless technologies such as infrared, radio, and microwave are included in the definition of medium. It should be understood, however, that computer-readable storage media and data storage media do not include connections, carrier waves, signals, or other transient media, but are directed to non-transient, tangible storage media. Disk and disc, as used herein, includes compact disk (CD), laser disc, optical disc, digital versatile disc (DVD), and Blu-ray disc, where disks usually reproduce data magnetically, while discs reproduce data optically with lasers. Combinations of the above should be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor", as used herein may refer to any of the foregoing structure of any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, software systems, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:

receiving, by a computing system, issue data for a plurality of issues each related to at least one of governance or compliance associated with a policy from a risk management system, wherein the issue data for each respective issue of the plurality of issues includes an issue identifier;

generating, by the computing system using at least one machine learning model and based on the issue data, issue validation risk scores for the plurality of issues, wherein an issue validation risk score for the respective issue indicates a predicted probability that a resolution of the respective issue to satisfy the policy will fail validation within a fixed period of time;

generating a warning message for at least the respective issue of the plurality of issues based on the issue validation risk score for the respective issue being greater than a threshold;

tagging, by the computing system, the respective issue of the warning message for use as a feature input for training the at least one machine learning model;

updating, by the computing system, training data to include the feature input associated with the tagged respective issue, wherein the training data includes monitored validation failure outcomes associated with one or more issues of the plurality of issues for which warning messages were generated, and wherein the training data is used to train the at least one machine learning model;

determining, by the computing system, one or more features corresponding to a level of modified organizational attention applied to the tagged respective issue in response to the warning message; and revising, by the computing system and as part of training the at least one machine learning model using the updated training data that includes the monitored validation failure outcomes and the feature input associated with the tagged respective issue, parameters of the at least one machine learning model, wherein revising the parameters of the at least one machine learning model includes:

retuning hyperparameters of the at least one machine learning model using the monitored validation failure outcomes and the feature input associated with the tagged respective issue included in the updated training data and based on the one or more features corresponding to the level of modified organizational attention applied to the tagged respective issue.

2. The method of claim 1, further comprising generating data representative of a dashboard for display via a display device, wherein the dashboard indicates one or more issue identifiers of one or more issues of the plurality of issues along with the issue validation risk scores associated with the one or more issues, and wherein the dashboard further indicates a ranking of the one or more issues based on the issue validation risk scores associated with the one or more issues.

3. The method of claim 1, further comprising generating, by the computing system using at least one second machine learning model, second issue validation risk scores for the plurality of issues, wherein a second issue validation risk score for the respective issue indicates a predicted probability that the resolution of the respective issue will fail validation within a second fixed period of time, wherein the second fixed period of time is longer than the fixed period of time.

4. The method of claim 3, wherein generating the second issue validation risk scores for the plurality of issues comprises generating the second issue validation risk scores for the plurality of issues in parallel with generating the issue validation risk scores for the plurality of issues.

5. The method of claim 1, wherein the at least one machine learning model is a random forest model that includes an ensemble of predictive elements, wherein each predictive element determines whether the resolution of the respective issue will fail validation within the fixed period of time based on one or more features of the issue data for the respective issue, and wherein the issue validation risk score for the respective issue comprises a percentage of the predictive elements that determined that the resolution of the respective issue will fail validation within the fixed period of time.

6. The method of claim 1, further comprising preprocessing, by the computing system, the issue data for the plurality of issues, wherein preprocessing includes creating one or more variables from raw data of the issue data for the plurality of issues, wherein the one or more variables include one or more of numeric, categorical, or text variables.

7. The method of claim 1, further comprising processing, by the computing system, one or more variables created from the issue data for the plurality of issues into one or more features used as input to the at least one machine learning model, wherein processing includes performing feature extraction on the one or more variables.

8. The method of claim 7, wherein performing feature extraction includes generating text features as term frequency-inverse document frequency (TFIDF) vectors from text variables created from the issue data for the plurality of issues, wherein the TFIDF vectors comprise numeric presentations of the text variables.

9. The method of claim 7, wherein performing feature extraction includes generating numeric features by imputing and scaling numeric variables created from the issue data for the plurality of issues.

10. The method of claim 7, wherein performing feature extraction includes generating categorical features by encoding categorical variables created from the issue data for the plurality of issues.

11. The method of claim 1, further comprising monitoring performance of the at least one machine learning model over time, wherein monitoring performance includes monitoring validation failure outcomes for the one or more issues of the plurality of issues for which warning messages were generated to determine the monitored validation failure outcomes, and wherein the monitored validation failure outcomes further comprise one or more of failed validations or passed validations.

12. A computing system comprising:

one or more storage devices; and processing circuitry in communication with the one or more storage devices, the processing circuitry configured to:

receive issue data for a plurality of issues each related to at least one of governance or compliance associated with a policy from a risk management system, wherein the issue data for each respective issue of the plurality of issues includes an issue identifier;

generate, using at least one machine learning model and based on the issue data, issue validation risk scores for the plurality of issues, wherein an issue validation risk score for the respective issue indicates a predicted probability that a resolution of the respective issue to satisfy the policy will fail validation within a fixed period of time;

generate a warning message for at least the respective issue of the plurality of issues based on the issue validation risk score for the respective issue being greater than a threshold;

tag the respective issue of the warning message for use as a feature input for training the at least one machine learning model;

update training data to include the feature input associated with the tagged respective issue, wherein the training data includes monitored validation failure outcomes associated with one or more issues of the plurality of issues for which warning messages were generated, and wherein the training data is used to train the at least one machine learning model;

determine one or more features corresponding to a level of modified organizational attention applied to the tagged respective issue in response to the warning message; and revise, as part of training the at least one machine learning model using the updated training data that includes the monitored validation failure outcomes and the feature input associated with the tagged respective issue, parameters of the at least one machine learning model, wherein to revise the parameters of the at least one machine learning model, the processing circuitry is configured to:

retune hyperparameters of the at least one machine learning model using the monitored validation failure outcomes and the feature input associated with the tagged respective issue included in the updated training data and based on the one or more features corresponding to the level of modified organizational attention applied to the tagged respective issue.

13. The computing system of claim 12, wherein the processing circuitry is further configured to generate data representative of a dashboard for display via a display device, wherein the dashboard indicates one or more issue identifiers of one or more issues of the plurality of issues along with the issue validation risk scores associated with the one or more issues, and wherein the dashboard further indicates a ranking of the one or more issues based on the issue validation risk scores associated with the one or more issues.

14. The computing system of claim 12, wherein the processing circuitry is further configured to generate, using at least one second machine learning model, second issue validation risk scores for the plurality of issues, wherein a second issue validation risk score for the respective issue indicates a predicted probability that the resolution of the respective issue will fail validation within a second fixed period of time, wherein the second fixed period of time is longer than the fixed period of time.

15. The computing system of claim 14, wherein to generate the second issue validation risk scores for the plurality of issues, the processing circuitry is configured to generate the second issue validation risk scores for the plurality of issues in parallel with generation of the issue validation risk scores for the plurality of issues.

16. The computing system of claim 12, wherein the at least one machine learning model is a random forest model that includes an ensemble of predictive elements, wherein each predictive element determines whether the resolution of the respective issue will fail validation within the fixed period of time based on one or more features of the issue data for the respective issue, and wherein the issue validation risk score for the respective issue comprises a percentage of the predictive elements that determined that the resolution of the respective issue will fail validation within the fixed period of time.

17. The computing system of claim 12, wherein the processing circuitry is further configured to preprocess the issue data for the plurality of issues, wherein to preprocess the issue data, the processing circuitry is configured to create one or more variables from raw data of the issue data for the plurality of issues, wherein the one or more variables include one or more of numeric, categorical, or text variables.

18. The computing system of claim 12, wherein the processing circuitry is further configured to process one or more variables created from the issue data for the plurality of issues into one or more features used as input to the at least one machine learning model, wherein to process the one or more variables, the processing circuitry is configured to perform feature extraction on the one or more variables.

19. A non-transitory computer-readable storage medium comprising instructions that, when executed, cause processing circuitry to:

receive issue data for a plurality of issues each related to at least one of governance or compliance associated with a policy from a risk management system, wherein the issue data for each respective issue of the plurality of issues includes an issue identifier;

generate, using at least one machine learning model and based on the issue data, issue validation risk scores for the plurality of issues, wherein an issue validation risk score for the respective issue indicates a predicted probability that a resolution of the respective issue to satisfy the policy will fail validation within a fixed period of time;

generate a warning message for at least the respective issue of the plurality of issues based on the issue validation risk score for the respective issue being greater than a threshold;

tag the respective issue of the warning message for use as a feature input for training the at least one machine learning model;

update training data to include the feature input associated with the tagged respective issue, wherein the training data includes monitored validation failure outcomes associated with one or more issues of the plurality of issues for which warning messages were generated, and wherein the training data is used to train the at least one machine learning model;

determine one or more features corresponding to a level of modified organizational attention applied to the tagged respective issue in response to the warning message; and revise, as part of training the at least one machine learning model using the updated training data that includes the monitored validation failure outcomes and the feature input associated with the tagged respective issue, parameters of the at least one machine learning model, wherein to revise the parameters of the at least one machine learning model, the processing circuitry is configured to:

retune hyperparameters of the at least one machine learning model using the monitored validation failure outcomes and the feature input associated with the tagged respective issue included in the updated training data and based on the one or more features corresponding to the level of modified organizational attention applied to the tagged respective issue.

* * * * *